(12) United States Patent
McCarthy et al.

(10) Patent No.: US 8,683,519 B2
(45) Date of Patent: Mar. 25, 2014

(54) FAVORITES MOSAIC

(75) Inventors: Mary McCarthy, Frisco, TX (US);
Roland Noll, San Antonio, TX (US);
Scott Alan Pettit, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 494 days.

(21) Appl. No.: 11/862,015

(22) Filed: Sep. 26, 2007

(65) Prior Publication Data

US 2009/0083824 A1    Mar. 26, 2009

(51) Int. Cl.
*G06F 3/00*    (2006.01)

(52) U.S. Cl.
USPC .................................. 725/44; 725/43; 725/41

(58) Field of Classification Search
None
See application file for complete search history.

(56) References Cited

U.S. PATENT DOCUMENTS

| 7,061,549 | B1 | 6/2006 | Mabon |
| 7,174,512 | B2 * | 2/2007 | Martin et al. ................. 715/719 |
| 2006/0120624 | A1 * | 6/2006 | Jojic et al. ..................... 382/284 |
| 2007/0011702 | A1 * | 1/2007 | Vaysman ........................ 725/45 |
| 2007/0079330 | A1 | 4/2007 | Ludvig et al. |
| 2007/0204297 | A1 * | 8/2007 | Gonzalez ........................ 725/41 |
| 2007/0204302 | A1 * | 8/2007 | Calzone .......................... 725/46 |

* cited by examiner

*Primary Examiner* — Brian Pendleton
*Assistant Examiner* — Jean D Saint Cyr
(74) *Attorney, Agent, or Firm* — Jackson Walker L.L.P.

(57) ABSTRACT

A set-top box generates a multimedia signal that includes streaming video for a plurality of currently available multimedia channels. A user configures a plurality of favorite channels. Streaming video from the favorite channels is provided in a plurality of viewports on a display. A user presses a favorites button on a remote control to prompt an application server to signal a content server to provide a compound video signal including streaming video from each favorite channel. The set-top box produces a resultant video signal including the streaming video from each favorite channel in a corresponding viewport. The viewports correspond to a mosaic template that may be hosted by the application server and accessed by the content server.

17 Claims, 5 Drawing Sheets

FAVORITES MOSAIC

BACKGROUND

1. Field of the Disclosure

The present disclosure generally relates to providing multimedia content, and more specifically, to displaying multiple viewports related to a user's favorite channels.

2. Description of the Related Art

Many television systems allow a user to specify the user's favorite channels. For example, a user may depress a "favorite channel" button on a remote control or scroll over a "favorites" icon on a graphical user interface to result in a set-top box serially displaying one favorite channel after the next on a display. In other systems, a request by a user may result in a text-based list of favorite channels appearing on a display.

DESCRIPTION OF THE EMBODIMENT(S)

Figure 1:
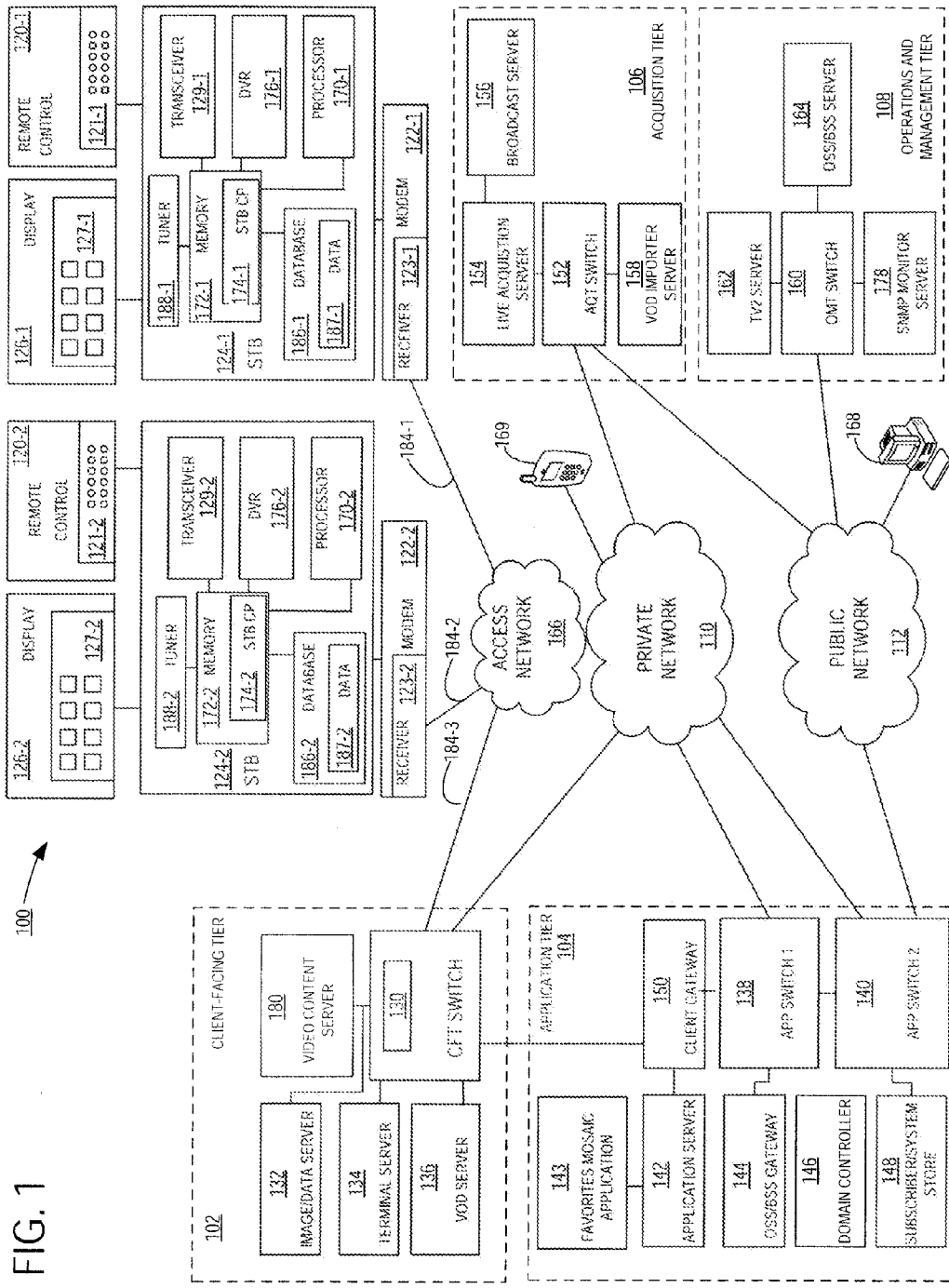
FIG. 1 illustrates a representative Internet Protocol Television (IPTV) system for implementing disclosed embodiments.

In one aspect, an embodied set-top box is disclosed. The set-top box includes a memory for storing a client application. The client application is operable for receiving a user request to view a user-specified set of favorite channels. The client application is further operable for calling a favorite channel application hosted on an application server. The set-top box is enabled for providing a resultant video stream for a display. The resultant video stream is based on a plurality of multimedia content feeds. Each multimedia content feed corresponds to one of the predetermined set of favorite channels. Each multimedia content feed includes streaming video associated with currently available content on one of the predetermined set of favorite channels.

In another aspect, a computer program product is provided that includes computer executable instructions stored on a computer readable medium. The computer program product is for providing multimedia content. The instructions are operable for detecting a favorites mosaic request associated with a user. The instructions are operable for obtaining user-definable data indicative of the user's favored channels. The favored channels include a first channel and a second channel. The instructions are operable for generating a mosaic object. The mosaic object includes instructions to retrieve a first multimedia content stream associated with the first channel and a second multimedia content stream associated with the second channel. The mosaic object includes instructions to generate a display stream comprising a mosaic template including a first viewport and a second viewport. The first multimedia content stream plays within the first viewport and the second multimedia content stream plays within the second viewport.

In still another aspect, a method of providing a service is disclosed in which the service enables a mosaic favorites feature. The method includes provisioning an application server with a mosaic favorites application. The mosaic favorites application is operable to respond to receiving a mosaic favorites request associated with a user. The mosaic favorites application retrieves user definable data indicative of at least one favorite channel of the user. The mosaic favorites application generates a mosaic favorites object that includes the user definable data and instructions. The user definable data and instructions are operable when executed to generate a display stream. The display stream includes a mosaic template including at least one favorites viewport and at least one additional viewport. The video stream associated with the favorite channel plays in the favorites viewport. The mosaic favorites application sends the mosaic favorites object to a set-top box associated with the user.

In the following description, for the purposes of explanation, numerous specific details are set forth in order to provide a thorough understanding of the disclosed embodiments. It should be apparent, however, to a person of ordinary skill in the art, that the disclosed embodiments may be practiced without some of these specific details. In other instances, well-known structures and devices may be shown in block diagram form.

Television programs, movies, radio programming and other multimedia content may be distributed over telephone company networks, coaxial-based networks, satellite transmissions, WiFi transmission, WiMAX transmission, and the like. In some systems, for example traditional coaxial-based "cable" systems, a service provider may distribute a number of television channels simultaneously at different frequencies through the same coaxial or fiber-optic cable. In conjunction, a set-top box or a tuner within a television, radio, or recorder selects one or more channels from the compound signal to play or record. In contrast to such systems that simultaneously distribute every available channel at all times, Internet Protocol Television (IPTV) systems generally distribute content to a user only in response to a user requesting it. Such IPTV systems typically use Internet Protocol (IP) and other technologies found in computer networks. To provide IPTV, a user's telephone lines may be used in some combination with a residential gateway (RG), a digital subscriber line (DSL) modem, a set-top box (STB), a display, and other such equipment to receive and convert into usable form the multimedia content provided from a telephone company network, for example.

IPTV providers, satellite-based providers, digital cable providers, and others may distribute multimedia content using bidirectional (i.e., two-way) communication between a user's customer premises equipment (CPE) and the service provider's equipment. Bidirectional communication allows a service provider to offer advanced features, such as video-on-demand (VOD), pay-per-view, advanced programming information, text-based news, and the like. Such systems may also enable a service provider to collect information related to a user's preferences, such as a user's favorite channels.

Disclosed embodiments provide users with a feature for storing a plurality of favorite or favored channels in an STB (or alternatively, on a component of the service provider). A user may provide an input, such as by pressing a button on a remote control, that results in the simultaneous presentation of a plurality of viewports on a display in communication with the STB. Each viewport corresponds to one of a user's favorite channels and provides streaming video of the content that is currently available on the corresponding channel.

Referring now to the drawings, FIG. 1 illustrates selected aspects of an embodied IPTV system 100 operated as part of a service provider network. Throughout this disclosure, a hyphenated form of a reference numeral refers to a specific instance of an element and the un-hyphenated form of the reference numeral refers to the element generically or collectively. Thus, for example, reference numeral 124-1 refers to an instance of an element 124. As shown in FIG. 1, IPTV system 100 includes two set-top boxes (STBs) 124 including STB 124-1 and STB 124-2. In the depicted embodiment, STBs 124 communicate through access network 166 via modems 122 (i.e., modem 122-1 and modem 122-2).

As shown, IPTV system 100 is configured to provide multimedia content to users of STBs 124 and includes a client facing tier 102, an application tier 104, an acquisition tier 106, and an operations and management tier 108. Each tier 102, 104, 106 and 108 is coupled to a private network 110, to a public network 112 (e.g., the Internet), or to both the private network 110 and the public network 112. Any of the various tiers coupled to the various networks may communicate with each other over the networks. For example, as shown, the client-facing tier 102 may communicate through the private network 110 with the acquisition tier 106. Further, as shown, the application tier 104 may communicate through the private network 110 and the public network 112 with the acquisition tier 106. The interconnections between illustrated tiers and networks in FIG. 1 are meant as instructive and not limiting.

As shown, IPTV system 100 distributes multimedia content to users of STBs 124 for viewing on displays 126 and possibly for sending to other components not shown, such as stereo equipment. In order to distribute the multimedia content, IPTV system 100 must first gain access to the multimedia content. To that end, acquisition tier 106 represents a variety of systems to acquire multimedia content, reformat it when necessary, and prepare it for transmission over private network 110 or public network 112. In its capacity at acquiring and distributing multimedia for use on IPTV system 100, acquisition tier 106 serves as a "content headend." Acquisition tier 106 may include, for example, systems for capturing analog and/or digital content feeds, either directly from a content provider or from a content aggregation facility. Content feeds transmitted via VHF/UHF broadcast signals may be captured by broadcast server 156. Similarly, live acquisition server 154 may capture satellite signals, high-speed fiber feeds, or programming feeds sent over other suitable transmission means. Content feeds to live acquisition server 154 may include broadcasted multimedia content, for example premium audio/video programming (i.e., traditional "cable channels") widely available but not typically broadcast over airwaves. Acquisition tier 106 may further include signal conditioning systems and content preparation systems for encoding content. As shown, acquisition tier 106 includes video on demand (VoD) importer server 158 and may include a digital rights management (DRM) server for encrypting content (not shown). VOD importer server 158 receives content from one or more VOD sources that may be outside the IPTV system 100, for example discs or transmitted feeds. VOD importer server 158 may temporarily store multimedia content for transmission to a VOD server 136 on client-facing tier 102. In addition, the VOD content may be stored at one or more servers, such as the VOD server 136. The stored VOD content may be distributed by multicast (i.e., a single stream sent simultaneously to multiple viewers) or by unicast to individual users in a VOD system.

After acquiring the multimedia content, IPTV system 100 distributes the content over private network 110, for example. Private network 110 may be referred to as a "core network." In some embodiments, private network 110 consists of a fiber backbone (i.e. WAN) and one or more video hub offices (VHOs). Generally, private network 110 transports multimedia content (e.g. video, music, Web pages, channel lineups, and data) from the acquisition tier 106 to STBs 124 through access network 166 (via client-facing tier (CFT) switch 130). In this role, private network 110 serves as the "backbone" for IPTV system 100. In a large deployment of IPTV system 100 that covers a vast geographic region, private network 110 may represent several smaller networks that each may only transfer content within a subset of the region. Accordingly, private network 110 may provide for the insertion of local content that is relevant only to a subset region. For example, private network 110 may allow for the localized insertion of local advertisements or local emergency alert systems for a particular service area.

To illustrate the distribution of multimedia content acquired by acquisition tier 106, in an example embodiment, broadcast server 156 acquires broadcast multimedia content and communicates it to live acquisition server 154. Live acquisition server 154 transmits the multimedia content to the AQT (AcQuisition Tier) switch 152. In turn, the AQT switch 152 transmits the multimedia content to the CFT switch 130, for example, via the private network 110. As shown, the CFT switch 130 may communicate the multimedia content through modems 122 via the private access network 166. In some embodiments, STBs 124 receive the multimedia content via modems 122 and transmit it to displays 126.

In some embodiments, live acquisition server 154 and VOD importer server 158 take numerous data streams and encode them into a digital video format, such as MPEG-2, or MPEG-4. After encoding, data streams may be encapsulated into IP data streams and transmitted to specific IP destinations (e.g. STBs 124) in response to a user's request for a particular channel, for example. Video content server 180, VOD server 136, or image/data server 132 may act as an intermediary or repository for multimedia content obtained and encoded by acquisition tier 106. In some embodiments, multimedia content is transmitted to the video content server 180, where it is encoded, formatted, stored, or otherwise manipulated and prepared for communication to the set-top box 124.

As shown, IPTV system 100 includes access network 166. Access network 166 provides a network link from the private network 110 to each consumer's location. To this end, access network 166 provides a network translation as necessary from a switched network, for example, to the access technology used to transmit data and multimedia content to the consumer's location. For example, a service provider that uses twisted-pair telephone lines to deliver multimedia content to consumers may utilize digital subscriber lines within access network 166. The digital subscriber lines may utilize some combination of DSL, DSL2, DSL2+, ADSL, VDSL or other technologies. In some embodiments, access network 166 may use fiber-to-the-home (FTTH). In such cases, optical fiber may be used all the way to the consumer's location to easily provide high-bandwidth. In other embodiments, fiber-to-the-curb (FTTC) deployments are used to deliver multimedia content to consumers. In such cases, a digital subscriber line access multiplexer (DSLAM) may be used within access network 166 to transfer signals containing multimedia content from optical fiber to copper wire for DSL delivery to consumers. In other embodiments, access network 166 may use RF signals sent over coaxial cables. Accordingly, access network 166 may utilize quadrature amplitude modulation (QAM) equipment for downstream traffic. In these systems, access network 166 may receive upstream traffic from a consumer's location using quadrature phase shift keying (QPSK)

modulated RF signals. In such systems, a cable modem termination system (CMTS) may be used to mediate between IP-based traffic on private network 110 and access network 166.

In operation, if a user requests VOD content via an STB 124, the request may be transmitted over the access network 166 to VOD server 136, via the CFT switch 130. Upon receiving the request, the VOD server 136 retrieves or accesses the requested VOD content and transmits the content to the STB 124 across access network 166 via CFT switch 130. In turn, STB 124 transmits relevant video portions of the VOD content to the display device 126. STB 124 may transmit audio portions of the VOD content to a stereo system (not shown) or may allow (or disallow) sending the VOD content to a recording device (not shown).

As shown, IPTV system 100 includes application tier 104. Application tier 104 communicates with acquisition tier 106 and client-facing tier 102 through private network 110. Application tier 104 may communicate through various communication protocols including hypertext transfer protocol (HTTP). Generally, application tier 104 may include notification servers, billing servers, and any of a variety of subscriber application servers employed by an owner or operator (i.e. network service provider) of IPTV system 100. In some embodiments, elements of the application tier 104 such as client gateway 150 communicate directly with the client-facing tier 102. The components of client-facing tier 102 may communicate using HTTP, transmission control protocol (TCP) or datagram protocol (UDP), as examples.

As illustrated in FIG. 1, the client-facing tier 102 is coupled for communication with user equipment (e.g. modems 122) via access network 166. Access network 166 may be considered the "last mile" for a service provider or network operator. It provides network connectivity of IPTV services to consumers' locations. Client-facing tier 102 may be required to multicast multimedia content to multiple destinations. For example, the same multimedia content may be distributed substantially simultaneously to STB 124-1 and STB 124-2. In contrast to a multicast or a unicast, some embodiments "broadcast" programming or data to all users on a network as a "broadcast" transmission. For example, a TV guide feature for displaying available programming may be broadcast to every user.

To deliver multimedia content, embodied client-facing tier 102 may employ any current or future Internet protocols for providing reliable real-time streaming multimedia content. In addition to the TCP, UDP, and HTTP protocols discussed above, such protocols may use, in various combinations, other protocols including, file transfer protocol (FTP), real-time transport protocol (RTP), real-time control protocol (RTCP), and real-time streaming protocol (RTSP), as examples. In some embodiments, client-facing tier 102 sends multimedia content encapsulated into IP packets over access network 166. For example, an MPEG-2 transport stream may be sent, in which the transport stream consists of a series of 188 byte transport packets, for example. To ensure quality of service, protocols should be chosen that minimize dropped packets, jitter, delay, data corruption, and other errors.

As shown, modems 122 include a receiver 123 for receiving data 184-1. As shown, the client-facing tier 102 may communicate with a large number of set-top boxes, such as representative STBs 124, over a wide area, which may be for example, a regional area, a metropolitan area, a viewing area, a designated market area, or any other suitable geographic area, market area, or user group supported by networking the client-facing tier 102 to numerous set-top boxes. In an illustrative embodiment, the client-facing tier 102, or any portion thereof, may be included at a video headend office (not depicted).

In some embodiments, the client-facing tier 102 may be coupled to modems 122 via fiber optic cables. Alternatively, modems 122 may be DSL modems coupled to one or more network nodes via twisted pairs. Each set-top box 124 may process data received over the private access network 166 via various IPTV software platforms that are commonly known.

In an illustrative embodiment, the client-facing tier 102 includes a CFT switch 130 that manages communication between the client-facing tier 102 and the private access network 166. CFT switch 130 also manages communication between the client-facing tier 102 and the private network 110 and is coupled to an image and data server 132 that may store streaming multimedia content and possibly still images associated with programs of various IPTV channels. Image and data server 132 stores data related to various channels, for example, types of data related to the channels and to programs or video content displayed via the channels. In an illustrative embodiment, image and data server 132 may be a cluster of servers, each of which may store streaming multimedia content, still images, channel and program-related data, or any combination thereof. CFT switch 130 may also be coupled to terminal server 134 that provides terminal devices with a connection point to the private network 110. As shown, CFT switch 130 may also be coupled to VOD server 136 that stores or provides VOD content imported by the IPTV system 100. As shown, the client-facing tier 102 also includes video content server 180 that transmits video content requested by viewers to STBs 124. In some embodiments, video content server 180 includes one or more multicast servers.

As illustrated in FIG. 1, application tier 104 may communicate with numerous components through private network 110 and public network 112. As shown, application tier 104 includes a first application tier (APP) switch 138 and a second APP switch 140. The first APP switch 138 is coupled to the second APP switch 140 and a combination operation-systems-support (OSS) and billing-systems-support (BSS) gateway 144 (i.e., OSS/BSS gateway 144). In some embodiments, the OSS/BSS gateway 144 controls access to an OSS/BSS server 164 that stores operations and billing systems data.

As shown, application tier 104 includes application server 142. In some embodiments, application service may include electronic programming guides (EPG), conditional access systems (CAS), digital rights management (DRM) servers, a navigation/middleware server, and IPTV portal, e-mail services, and remote diagnostics. Application server 142 runs applications that assist in requesting multimedia or data content on displays 126. For example, a user of STB 124-1 may request the display of a "favorites mosaic" by depressing one or more "favorites" buttons among buttons 121-1 on remote control 120-1. In some embodiments, the favorites mosaic includes a plurality of viewports or thumbnails that contain streaming video content corresponding to programming currently available on a user's favored or favorite channels. Upon the user of remote control 120-1 depressing a favorites button among buttons 121-1, STB 124-1 calls application server 142. Application server 142 may host a template (i.e., a mosaic object) for arranging on display 126-1 the favorites mosaic associated with the user of remote control 120-1. The template may contain "holes" that may have associated executable commands used in enabling video content server 180 to populate the favorites mosaic with streaming video content corresponding to currently available multimedia programming available on the favored or favorite channels of the user of remote control 120-1. Similarly, applications server 142 may host application that, for example, assist VOD server 136 in providing VOD programming to the user of STB 124-1, display 126-1, and remote control 120-1.

As shown in FIG. 1, second APP switch 140 is communicatively coupled to a domain controller 146 that provides web access, for example, to users via the public network 112. The second APP switch 140 is communicatively coupled to a user and system store 148 that includes account information, such as account information that is associated with users who access the system 100 via the private network 110 or the public network 112. Therefore, for example, a user may employ a personal computer 168 to receive IPTV account information via the public network 112. Similarly, a user may employ cellular telephone 169 or another similar multifunction device over private network 110 or public network 112 to receive information through second APP switch 140. In some embodiments, application tier 104 may also include a client gateway 150 that communicates data directly with the client-facing tier 102. In these embodiments, the client gateway 150 may be coupled directly to the CFT switch 130. Accordingly, the client gateway 150 may provide user access to the private network 110 and the tiers coupled thereto.

In some embodiments STB 124 accesses the IPTV system 100 via the private access network 166, using information received from the client gateway 150. In such embodiments, private access network 166 may provide security for the private network 110. Therefore, user devices may access the client gateway 150 via the private access network 166, and the client gateway 150 may allow such devices to access the private network 110 once the devices are authenticated or verified. Similarly, the client gateway 150 may prevent unauthorized devices, such as hacker computers or stolen set-top boxes, from accessing the private network 110, by denying access to these devices beyond the private access network 166.

Accordingly, in some embodiments, when an STB 124 accesses the system 100 via the private access network 166, the client gateway 150 verifies user information by communicating with the subscriber/system store 148 via the private network 110, the first APP switch 138, and the second APP switch 140. The client gateway 150 verifies billing information and user status by communicating with the OSS/BSS gateway 144 via the private network 110 and the first APP switch 138. The OSS/BSS gateway 144 may transmit a query across the first APP switch 138, to the second APP switch 140, and the second APP switch 140 may communicate the query across the public network 112 to the OSS/BSS server 164. Upon the client gateway 150 confirming user and/or billing information, the client gateway 150 allows the STB 124 access to IPTV content, VOD content, and other services. If the client gateway 150 cannot verify user information for the STB 124, for example, because it is connected to an unauthorized twisted pair or residential gateway, the client gateway 150 may block transmissions to and from the STB 124 beyond the private access network 166.

STBs 124 convert digital compressed signals into a format suitable for display. STBs 124 have functionality for recognizing and acting on IP packets, for example UDPs transmitted within IP datagrams. STBs 124 may contain software or firmware coding for sending requests to application server 142, for example, to receive requested programming or data. In some embodiments, requests for content (e.g. VOD content) flow through a billing or management server to verify that a user is not in arrears on his or her bill. In some embodiments, STB 124 supports Web browsing on the Internet (e.g., public network 112) and may support cycling through guide data, for example, using Web services. Each STB 124 may be enabled for viewing e-mail, viewing e-mail attachments, and interfacing with various types of home networks.

In accordance with disclosed embodiments, each STB 124 may be a cable box, a satellite box, or an electronic programming guide box. Further, although shown separately, STBs 124 may be incorporated into any multifunctional device such as, a television, a videocassette recorder, a computer, a personal computer media player, or other media device. Generally, STBs 124 each represent a dedicated data processing system (i.e. computer) that provides an interface between a display and a service provider. As shown, STBs 124 are connected to the service provider through modems 122. Although modems are shown in FIG. 1, other residential gateways may be employed. Alternatively, STBs 124 may be connected directly to access network 166.

STBs 124 contain software or firmware instructions stored in memories 172 or other storage for receiving and processing input from remote controls 120. In some embodiments, STBs 124 are IP based set-top boxes and have capability for outputting resultant multimedia signals (e.g., streaming audio/video) in various formats including S-video, composite video, high definition component video, high definition multimedia interface (HTMI), and video graphics array (VGA) signals. The resultant multimedia signals may support displays 126 that have various video modes including analog NTSC, 1080i, 1080p, 480i, 480p, 720p, as examples. In some embodiments, STBs 124 communicate with modems 122 over local area networks (LANs) connected using CAT5 cables, CAT6 cables, wireless interfaces, or a Home Phoneline Networking Alliance (HPNA) network, as examples.

As shown STBs 124 are coupled to displays 126. Each display 126 may include a cathode ray tube (CRT), television, monitor, projected image, LCD screen, holograph, or other graphical equipment. In accordance with disclosed embodiments, displays 126 display a user's favorites mosaic which includes streaming video of content currently available on the user's favorite (or favored) channels.

STBs 124 communicate with remote controls 120. In accordance with disclosed embodiments, remote controls 120 include favorites buttons 121 that a user depresses to initiate display of a favorites mosaic on display device 126. STBs 124 may include wireless transceivers 129 to communicate with wireless transceivers (not shown) of remote controls 120. Although the term "buttons" is used to describe some embodiments herein, other forms of input may be used. For example, touch screens associated with remote controls 120 may be used to accept user input. Alternatively, remote controls 120 may be used in conjunction with STBs 124 to operate graphical user interfaces (GUIs) displayed on displays 126. In such systems, a user may position a pointer over the word "favorite" or position a pointer over a "favorites" icon on the GUI to initiate a mode for displaying a favorites mosaic.

STBs 124 as shown receive data 184, which may include video content and/or audio content or portions, from the client-facing tier 102 via the private access network 166. Data 184 may be associated with at least one program, such as a broadcast program, that includes streaming multimedia content. As it receives data 184, STBs 124 may store the content or may format the content into a resultant multimedia signal for sending to displays 126 and other equipment (not shown) for producing portions of the multimedia content in usable form.

As shown, each STB 124 includes an STB processor 170 and an STB memory 172 that is accessible by STB processor 170. An STB computer program (STB CP) 174, as shown, is embedded within each STB memory device 172. In accordance with disclosed embodiments, the STB CP 174 may include a client application for calling a favorites mosaic application on application server 142. As shown, memory devices 172 are coupled with databases 186 that each include data 187. Data 187 may include favorite channels of a user or multiple users of each STB 124.

In addition or in conjunction with STB components illustrated in FIG. 1, STBs 124 may contain modules for transport, de-multiplexing, audio/video encoding and decoding, audio digital to analog converting, and radio frequency (RF) modulation. For clarity, such details for these modules are not shown in FIG. 1. In addition details are not provided for allowing STBs 124 to communicate through access network 166 through modems 122. However, such communications can be carried out with known protocols and systems for network interfacing such as conventional network interface cards (NICs) used in personal computer platforms. For example STB 124 may use a network interface that implements level 1 (physical) and level 2 (data link) layers of a standard communication protocol stack by enabling access to a twisted pair or other form of physical network medium and supporting low level addressing using media access control (MAC) addressing. In these embodiments, STBs 124 may each have a network interface including a globally unique 48-bit MAC address stored in a ROM or other persistent storage element. Similarly, each modem 122 (or other RG) may have a network interface (not depicted) with its own globally unique MAC address. Further, although STBs 124 are depicted with various functions in separate components, these components may be implemented with a system on chip (SoC) device that integrates two or more components.

As shown, STBs 124 may also include a video content storage module, such as a digital video recorder (DVR) 176. In a particular embodiment, STBs 124 may communicate commands received from the remote control devices 120 to the client-facing tier 102 via the private access network 166. Commands received from the remote control devices 120 may be entered via favorites buttons 121. The commands received (i.e. user input) may include a selection of one of the viewports in favorites mosaic 127 on the displays 126.

IPTV system 100 includes an operations and management tier 108 that has an operations and management tier (OMT) switch 160. OMT switch 160 conducts communication between the operations and management tier 108 and the public network 112. The OMT switch 160 is coupled to a TV2 server 162. Additionally, the OMT switch 160 as shown is coupled to an OSS/BSS server 164 and to a simple network management protocol (SNMP) monitor server 178 that monitors network devices within or coupled to the IPTV system 100. In some embodiments, the OMT switch 160 communicates with the AQT switch 152 via the public network 112.

In an illustrative embodiment, the live acquisition server 154 transmits the multimedia content to the AQT switch 152, and the AQT switch 152, in turn, transmits the multimedia content to the OMT switch 160 via the public network 112. In turn, the OMT switch 160 transmits the multimedia content to the TV2 server 162 for display to users accessing the user interface at the TV2 server 162. For example, a user may access the TV2 server 162 using a personal computer (PC) 168 coupled to the public network 112.

Embodiments disclosed herein use IPTV system 100 to provide a user with a favorites mosaic that includes streaming video currently available on the user's favorite channels. A user of remote control 120 provides a user input through one or more favorites buttons 121 to prompt a display of a favorites mosaic 127 on display 126. For example, the user of remote control 120 may depress a favorites button among buttons 121. In response, STB 124 calls favorites mosaic application 143 hosted on application server 142. Favorites mosaic application 143 hosts a frame or template which contains URL calls to the user's favorite channels. The user's favorite channels may be stored in any memory accessible to favorites mosaic application 143 including subscriber/systems store 148. Alternatively, a user's favorite channels may be stored in memory 172 and accessed by favorites mosaic application 143. Preferably, a user stores his or her favorite channels prior to hitting a favorites button among buttons 121. However, if a user has not yet stored his or her favorite mosaics channels upon hitting the favorites button, the favorites mosaic application 143 may prompt the user of remote control 120 to enter a plurality of favorite channels (i.e., user-definable data) for future display with the favorites mosaic. Favorites mosaic application 143 hosts a frame (i.e., template) with URL calls (e.g. executable instructions) for populating the favorites mosaic upon display 126. In some embodiments, video content server 180 populates the frame using the URL calls or executable instructions to provide a streaming content over access network 166 to STB 124. In such cases, the URLs are part of instructions to retrieve at least one multimedia content stream for each favorite channel having an associated viewport in a favorites mosaic. STB 124 may receive or have stored instructions to generate a display stream made up of the mosaic template and viewports for each favorite channel. In some embodiments, the display stream includes a first viewport and a second viewport. A first multimedia content stream (substantially the same as and synchronized with content currently available on the corresponding favorite channel) plays within the first viewport and a second multimedia content stream (substantially the same as and synchronized with content currently available on the corresponding favorite channel) plays within the second viewport.

In accordance with disclosed embodiments, the displayed favorites mosaic contains a plurality of viewports or thumbnails that show streaming videos of whatever content is currently available on the favorite channels. Such a system provides the user with an easy way of determining whether he or she may want to change the channel to a particular favorite channel. If the user determines by viewing the favorites mosaic that a particular channel is showing a commercial, for example, the user may decide to wait for the commercial to end before changing to that channel.

A plurality of video viewports or thumbnails included in a favorites mosaic are presented substantially in real time with corresponding broadcasts that correspond to the favorite channels. In other words, the favorites mosaic is intended to display the streaming video content currently available on the favorite channels, so that a user may determine whether he or she wishes to switch to a favorite channel for full or partial display on a monitor (e.g. display 126). The plurality of video thumbnails may include a plurality of live broadcasts, prerecorded broadcasts, or VOD content. The plurality of video thumbnails or viewports may include a plurality of reduced size video images, and may include viewports of different sizes and different resolutions. STBs 124 may include a plurality of tuners 188, for example, one tuner for each of the viewports in favorites mosaic 127 displayed simultaneously on display 126. Alternatively, a template hosted by favorites mosaic application 143 or accessed by STB 124 may be used to automatically make URL calls for populating the viewports without the need for individual tuners.

In some embodiments, the channels include broadcast channels sent over coaxial cables. The channels may also include broadband channels, for example high-speed, high-capacity data transmission channels that send and receive information on cable. The cable, which may be coaxial cable or fiber-optic cable, may have a wider bandwidth than conventional telephone lines, and may have the ability to carry video, voice, data, and other multimedia content simultaneously.

Figure 2:
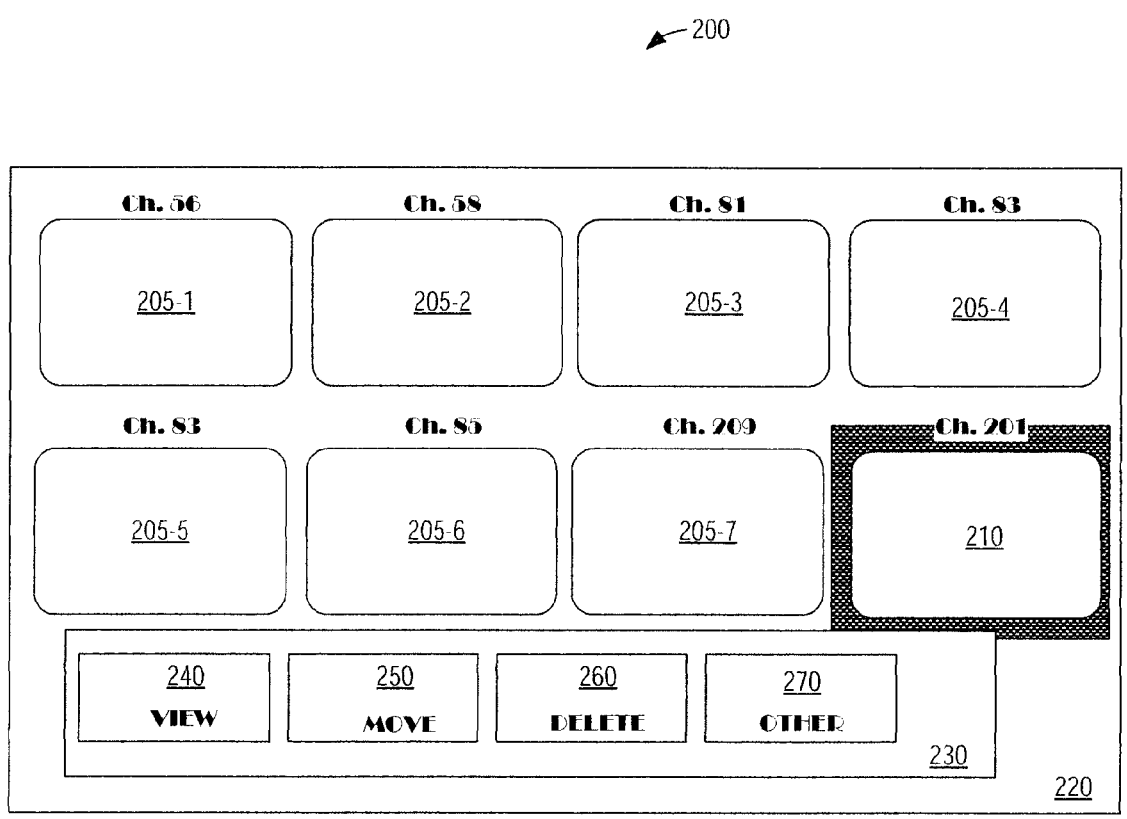
FIG. 2 illustrates an interface for displaying and selecting viewports, in which each viewport contains streaming video of one of a user's favorite channels.

FIG. 2 illustrates a graphical user interface 200 that includes a plurality of streaming video thumbnails (i.e., viewports) 205. In addition to the streaming video thumbnails, meta-data associated with programming may also be presented (not shown). For example, cast information, a show's title, a show's remaining time, a show's duration, or other information may be presented with graphical user interface 200. The video thumbnails may be presented in sequential order of most recently tuned-into broadcast channels, may be ordered according to how frequently they are viewed, or may be ordered according to a predetermined ranking stored by a user. The thumbnails 205 may be presented in a straight line, in an array (as shown), or in any other convenient presentation. In some embodiments, the number of thumbnails may correspond to the number of tuners 188 present in the STB 124 (FIG. 1). In other systems, such as IPTV systems, the graphical user interface 200 is determined by a template stored or hosted by application server 142 (FIG. 1). Upon a user providing user input to buttons 121 (FIG. 1), for example by depressing a "favorites" button (e.g., button 310 in FIG. 3), STB 124 calls to the favorites mosaic application 143 hosted on application server 142. This call to the favorites mosaic application 143 may result in one or more calls to other components of IPTV system 100, for example video content server 180. Upon being called, for example by executable instructions in a mosaic template hosted or accessed by favorites mosaic application 143, video content server 180 provides a streaming multimedia output for each viewport in the template. Accordingly, each viewport in a template is populated with streaming content that is currently available on a user's favorite channels. In some embodiments, STB 124 receives streaming multimedia content streams directly from video content server 180 over access network 166 without the content passing through the application server 142.

Figure 3:
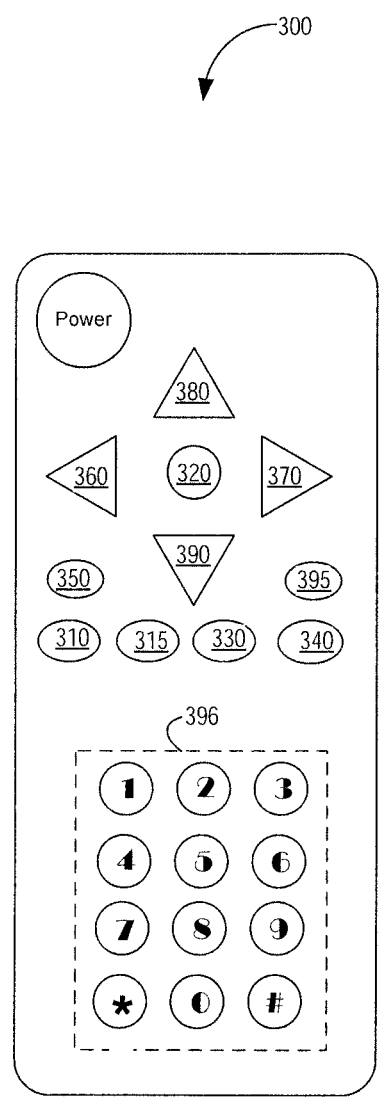
FIG. 3 illustrates an input device (i.e., remote control) for use with disclosed embodiments.

As shown in FIG. 2, thumbnail (i.e., viewport) 210 (i.e., channel 201) is highlighted with a darker background, in response to user input for selecting the viewport. This thumbnail may be selected using the navigation controls of the remote control 120 (i.e., input device), for example. As shown, the interface 200 includes a background 220, which may be a blank screen, a colored screen, or a streaming broadcast (not shown). If the background 220 is a streaming broadcast, it may or may not be the same channel as one of thumbnails 205 or 210. Interface 200, as part of a favorites mosaic, may also include a current channel viewport, with streaming video corresponding to the channel that was displayed upon the user requesting the favorites mosaic. The background broadcast (background 220) may be switchable to other channels using a channel up/down button, or to one of the thumbnails 205 using, for example, button 350 (FIG. 3) of remote control 300 (FIG. 3). In accordance with disclosed embodiments, thumbnails of video broadcasts, each consisting of streaming video, may be presented on the interface 200 after selecting the "favorites" button 310 (FIG. 3) of the input device to indicate a selection of an option to view the favorite channels mosaic in thumbnail format.

FIG. 3 illustrates a remote control 300 that may be used with disclosed embodiments. The remote control 300 may be identical or similar to remote controls 120 (FIG. 1). The buttons and functionality of remote controls 120 and remote control 300 are described to illustrate basic functionality and are not intended to limit other possible functionality that may be incorporated into embodied devices. For example, although not shown, the buttons or indicators of remote controls 120 (FIG. 1) or remote control 300 may include a button, a knob, or a wheel for receiving input. The remote control devices may also incorporate a touch screen with a graphical user interface and possibly a voice command receiver.

As illustrated in FIG. 3, remote control 300 has a "favorites" button 310, a "history" button 315, a "select" button 320, a "move" button 330, a "delete" or erase button 340, an "other" button 350 for other functions related to the thumbnails (i.e., viewports) or display, a "backward" or left-ward button 360, a "forward" or right-ward button 370, an "upward" button 380 (to maneuver up in an array, for instance), and a "downward" button 390. The buttons 310-390 may be arranged in any of a variety of ways, for example, placing the upward button 380 directly above the downward button 390, as shown.

The "select" button 320 may be used to request a channel to be viewed on the full display to the exclusion of other icons, menus, thumbnails, line-ups and/or other items. Button 320 may additionally be considered an "Enter" button or an "OK" button. Using remote control 300, thumbnails (or viewports 205 from FIG. 2) in favorites mosaic 127 (FIG. 1) may be navigated through use of the directional controls 360, 370, 380, 390. Remote control 300 may additionally have a mode dependent function, for example, activating button 395, to use existing keys for these same described functions in this alternative mode. Number pad 396 permits a user an option of selecting channels by entering numbers. For example, a display may show six numbered viewports, with each viewport showing streaming multimedia content currently available on six of the user's favored channels. A user may enter a number on number pad 396 that corresponds to a numbered viewport on display 200 (FIG. 2) to select the corresponding channel for full viewing on the display.

Referring to FIGS. 2 and 3, buttons 360, 370, 380 and 390 of remote control 300 may be used to navigate through the selection list of the plurality of video thumbnails 205 and 210 on the display. If a thumbnail is selected, for example thumbnail 210, the thumbnail may be highlighted as shown. The select button 320 of the remote control 300 may be used to select the thumbnail 210 to view the associated program content to the exclusion of the other thumbnails 205. Alternatively, the user may use navigation buttons on the input device to select a View icon 240 of an on-screen menu 230, as shown in FIG. 2. The move button 330 of the remote control 300 may be used to select the thumbnail 210 to move relative to other thumbnails 205 on the display. In this way, the user may have the option of grouping together certain channels or just setting up a preferred channel order. Alternatively, the user may use navigation buttons on the remote control 300 to select a Move icon 250 of the on-screen menu 230, as shown in FIG. 2. The delete button 340 of the remote control 300 may be used to select the thumbnail 210 to erase from the interface 200. Alternatively, the user may use navigation buttons on the input device to select a Delete icon 260 of the on-screen menu 230, as shown in FIG. 2. The "other" button 350 of the remote control 300 may be used to select the thumbnail 210 to display the representative channel in the background 220 of the interface 200, for instance. Alternatively, the user may use navigation buttons on the input device to select an Other icon 270 of the on-screen menu 230, as shown in FIG. 2.

Figure 4:
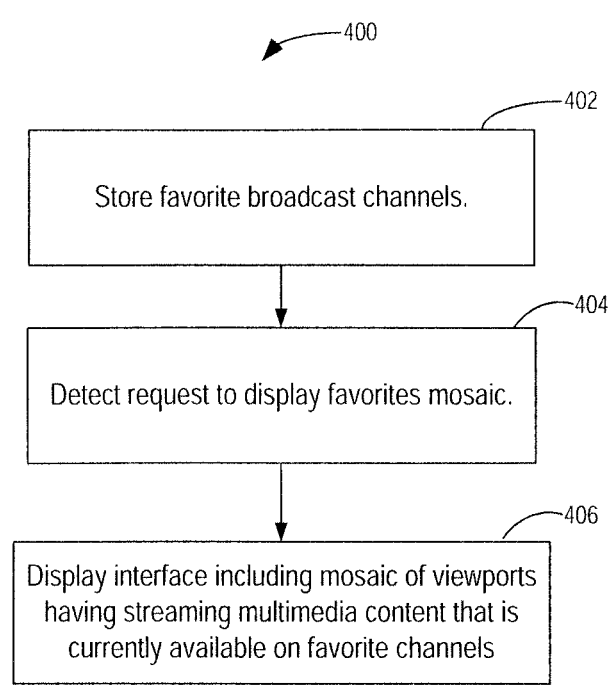
FIG. 4 illustrates a flow chart with blocks for storing favorite channels and displaying viewports containing streaming video related to a user's favorite channels.

FIG. 4 illustrates a flow chart 400 with blocks for viewing a selection of thumbnails according to an embodiment. At block 402, a plurality of favorite broadcast channels of a user may be stored, for example on a database 186 (FIG. 1) or on subscriber/system store 148 (FIG. 1). At block 404, a request to display a favorites mosaic is detected, for example by remote control 120 (FIG. 1) detecting a depressed "favorites" button and signaling STB 124 (FIG. 1), which in turn calls favorites mosaic application 143 hosted by application server 142 (FIG. 1). At block 406, an interface (e.g., interface 200 in FIG. 2) including a selection list of a plurality of video thumbnails (e.g., viewports 205 and 210) representing the plurality of broadcast channels, respectively, is displayed, for example, on display 126 (FIG. 1). In optional blocks (not shown), a selection list of the plurality of video thumbnails on the display may be navigated through to select the thumbnail using a remote control (for example remote control 120 or 300).

Figure 5:
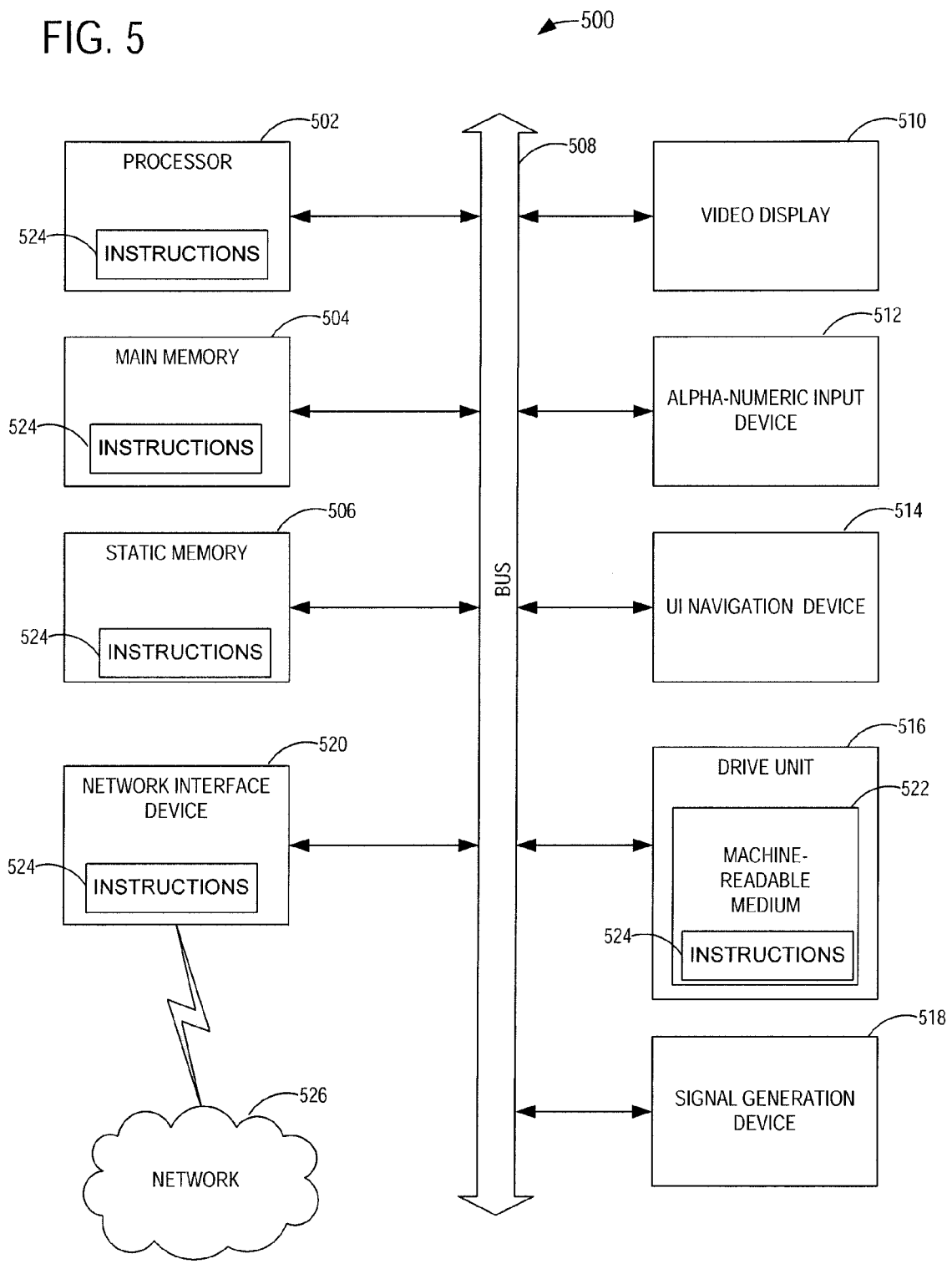
FIG. 5 depicts a data processing system operable to execute instructions in accordance with disclosed embodiments.

FIG. 5 is a diagrammatic representation of a machine in the example form of a computer system 500 within which a set of instructions for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a digital video recorder (DVR), a personal computer (PC), a tablet PC, a set-top box (STB), a cable box, a satellite box, an electronic programming guide box, a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The main memory 504 and/or the static memory 506 may be used to store the channel history data. The computer system 500 may further include a video display unit 510 (e.g., a television, a liquid crystal display (LCD) or a cathode ray tube (CRT)) on which to display broadcast or other programs, for example. The computer system 500 also includes an alphanumeric input device 512 (e.g., a keyboard or a remote control), a user interface (UI) navigation device 514 (e.g., a remote control, or a mouse), a disk drive unit 516, a signal generation device 518 (e.g., a speaker) and a network interface device 520. The input device 512 and/or the navigation device 514 (e.g., the remote control) may include a processor (not shown), and a memory (not shown). The disk drive unit 516 includes a machine-readable medium 522 on which is stored one or more sets of instructions and data structures (e.g., software 524) embodying or utilized by any one or more of the methodologies or functions described herein (e.g., the software to access the channel history data in the database 186). The software 524 may also reside, completely or at least partially, within the main memory 504 and/or within the processor 502 during execution thereof by the computer system 500.

The software 524 may further be transmitted or received over a network 526 (e.g., a television cable provider) via the network interface device 520 utilizing any one of a number of well-known transfer protocols (e.g., broadcast transmissions, HTTP). While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present invention, or that is capable of storing data structures utilized by or associated with such a set of instructions. The term "machine-readable medium" shall accordingly be taken to include, but not be limited to, solid-state memories and optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A set-top box, comprising:
 a processor having access to a memory including stored application instructions, executable by the processor, wherein the application instructions, when executed by the processor, cause the processor to perform operations comprising:
 generating a favorites mosaic video stream suitable for displaying on a display, wherein the favorites mosaic video stream includes:
 first streaming video and first metadata for a first multimedia content feed in a first mosaic window of a plurality of mosaic windows; and
 second streaming video and second metadata for a second multimedia content feed in a second mosaic window of the plurality of mosaic windows;
 wherein the first metadata and the second metadata both include at least two of:
 cast information, a show's title, a show's remaining time, and a show's duration;
 wherein the first mosaic window and the second mosaic window correspond to respective user favorite channels and provide streaming video of content currently available on the respective user favorite channels; and
 wherein the first mosaic window and the second mosaic windows are presented in an order determined based on a factor selected from:
 most recently tuned;
 most frequently viewed; and
 a predetermined ranking stored by the user; and
 generating an on-screen menu including:
 a delete icon that enables a user to delete a mosaic window and
 a move icon that enables a user to move one displayed mosaic window relative to other displayed mosaic windows;
 a third icon that enables a user to select a mosaic window to display a representative channel in a background of the favorites mosaic video stream; and
 a view icon.

2. The set-top box of claim 1, wherein generating the favorites mosaic video stream includes accessing a mosaic template, wherein the mosaic template defines a plurality of holes corresponding to a plurality of mosaic windows.

3. The set-top box of claim 2, wherein the mosaic template is stored in the memory.

4. The set-top box of claim 2, wherein the mosaic template is hosted by an application server.

5. The set-top box of claim of claim 4, wherein the operations include:
receiving a compound multimedia stream from the set-top box; and
decoding information in the compound multimedia stream to generate the favorites mosaic video stream.

6. The set-top box of claim 2, wherein the operations include:
preventing multimedia content feeds associated with a particular channel from inclusion with the favorites mosaic video stream.

7. The set-top box of claim 2, wherein each of the plurality of holes corresponds to a URL, wherein each URL indicates a source for a multimedia content feed.

8. A computer readable memory including stored, computer executable program instructions for providing multimedia content, wherein the program instructions, when executed by a computer, cause the computer to perform operations comprising:
accessing favored channel data indicative of favored channels associated with a user, wherein the favored channels include a first channel and a second channel; and
generating a display stream comprising a mosaic template including a plurality of viewports including a first viewport and a second viewport wherein a first multimedia content stream associated with the first channel plays within the first viewport and first metadata indicative of a content specific aspect of the first multimedia content stream is depicted in the first viewport and wherein a second multimedia content stream associated with the second channel plays within the second viewport and second metadata indicative of a content specific aspect of the second multimedia content stream is depicted in the second viewport;
wherein the first metadata and the second metadata both include at least two of:
cast information, a show's title, a show's remaining time, and a show's duration; and
wherein the first viewport and the second viewport correspond to respective user favorite channels and provide streaming video of content currently available on the respective user favorite channels;
the first viewport and the second viewport are presented in an order determined based on a factor selected from:
most recently tuned;
most frequently viewed; and
a predetermined ranking stored by the user;
wherein the display stream includes generating an on-screen menu including includes:
a delete icon that enables the user to delete a viewport; and
a move icon that enables a user to move one displayed viewport relative to other displayed viewports;
a third icon that enables a user to select a viewport to display a representative channel in a background of the favorites mosaic video stream; and
a view icon.

9. The computer readable memory of claim 8, wherein the operations include delivering the mosaic template to a set-top box associated with the user.

10. The computer memory of claim 8, wherein accessing the favored channel data includes retrieving the favored channel data from a networked storage resource.

11. The computer memory of claim 8, wherein:
the mosaic template further includes a current channel viewport, wherein a multimedia content stream associated with a current channel plays within the current channel viewport;
the current channel comprises a channel being viewed when a favorites mosaic request was detected;
the first metadata includes information selected from cast information, title information, remaining time information, and duration information; and
a dimension of the current channel viewport is greater than a dimension of the first viewport.

12. The computer memory of claim 8, wherein transmitting a first IP address from a set-top box to a content server, wherein the first IP address is associated with the first multimedia content stream.

13. A method of providing a mosaic favorites feature, the method comprising:
responsive to receiving a mosaic favorites request associated with a user, retrieving favored channel data indicative of favored channels of the user, generating a mosaic favorites object including:
generating a display stream comprising a mosaic template including a plurality of favorites viewports, wherein a first video stream associated with a first favored channel and first metadata describing a content specific aspect of the first video stream plays in a first viewport of the plurality of favorites viewport, and wherein a second video stream associated with a second favored channel and second metadata describing a content specific aspect of the second video stream plays in a second viewport of the plurality of favorites viewport; and
sending the mosaic favorites object to a set-top box associated with the user;
wherein the first metadata and the second metadata both include at least two of:
cast information, a show's title, a show's remaining time, and a show's duration; and
wherein the first viewport and the second viewport correspond to respective user favorite channels and provide streaming video of content currently available on the respective user favorite channels;
the first viewport and the second viewport are presented in an order determined based on a factor selected from:
most recently tuned;
most frequently viewed; and
a predetermined ranking stored by the user;
wherein the display stream includes generating an on-screen menu including includes:
a delete icon that enables the user to delete a viewport and a move icon that enables a user to move one displayed viewport relative to other displayed viewports;
a third icon that enables a user to select a viewport to display a representative channel in a background of the favorites mosaic video stream; and
a view icon.

14. The method of claim 13, further comprising providing a preferences application operable to enable the user to define the favored channel data.

15. The method of claim 13, further comprising configuring a set-top box to respond to a signal from a remote control unit by sending the mosaic favorites request to an application server.

16. The method of claim 13, wherein a resolution of the first viewport differs from a resolution of the second viewport.

17. The method of claim 13, wherein the mosaic template includes a viewport corresponding to each of the favored channels and wherein video streams associated with each favored channel play in their corresponding viewports.

* * * * *